United States Patent
Su

(10) Patent No.: US 8,150,742 B2
(45) Date of Patent: Apr. 3, 2012

(54) SYSTEM AND METHOD FOR MANAGING MERCHANDISE INFORMATION

(75) Inventor: Yin-Yuan Su, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 382 days.

(21) Appl. No.: 12/541,363

(22) Filed: Aug. 14, 2009

(65) Prior Publication Data

US 2010/0106618 A1    Apr. 29, 2010

(30) Foreign Application Priority Data

Oct. 23, 2008    (CN) .......................... 2008 1 0305102

(51) Int. Cl.
G06Q 30/00    (2006.01)
(52) U.S. Cl. ...................... 705/27.1; 705/26.1; 705/26.7
(58) Field of Classification Search ..................... 705/26, 705/27
See application file for complete search history.

(56) References Cited

U.S. PATENT DOCUMENTS

| | | | |
|---|---|---|---|
| 6,366,910 B1 * | 4/2002 | Rajaraman et al. ................... | 1/1 |
| 7,246,128 B2 * | 7/2007 | Jordahl ................................ | 1/1 |
| 7,966,225 B2 * | 6/2011 | Chan et al. ................... | 705/26.7 |
| 2003/0018652 A1 * | 1/2003 | Heckerman et al. ....... | 707/104.1 |
| 2003/0208399 A1 * | 11/2003 | Basak et al. ..................... | 705/14 |

OTHER PUBLICATIONS

Chickering et al.; Targeted Advertising on the Web with Inventory Management,: Interfaces, v33i5p. 71; Proquest #453206081, 10pgs.*

* cited by examiner

*Primary Examiner* — Rober M. Pond
(74) *Attorney, Agent, or Firm* — Altis Law Group, Inc.

(57) ABSTRACT

A system and method for managing merchandise information include acquiring merchandise information of a plurality of merchandises, and setting a plurality of categories and multi-level sub-categories to classify the merchandises. The system and method further include calculating a relative coefficient between a selected merchandise and each of the other merchandises in a same category as the selected merchandise, selecting related merchandises by comparing calculated relative coefficients with a threshold value, and linking the related merchandises to the selected merchandise.

12 Claims, 6 Drawing Sheets

SYSTEM AND METHOD FOR MANAGING MERCHANDISE INFORMATION

BACKGROUND

1. Technical Field

Embodiments of the present disclosure relate to data management, and more particularly to a system and method for managing merchandise information stored in an electronic device.

2. Description of Related Art

Product information, such as merchandising items, may be easily acquired from the Internet. The product information may include a product name, a product brand, product functions, retailers selling the products, retailer names, and retailer addresses, for example. How to organize the product information is critical for satisfying user demands.

What is needed, therefore, is an improved system and method for managing merchandise information.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
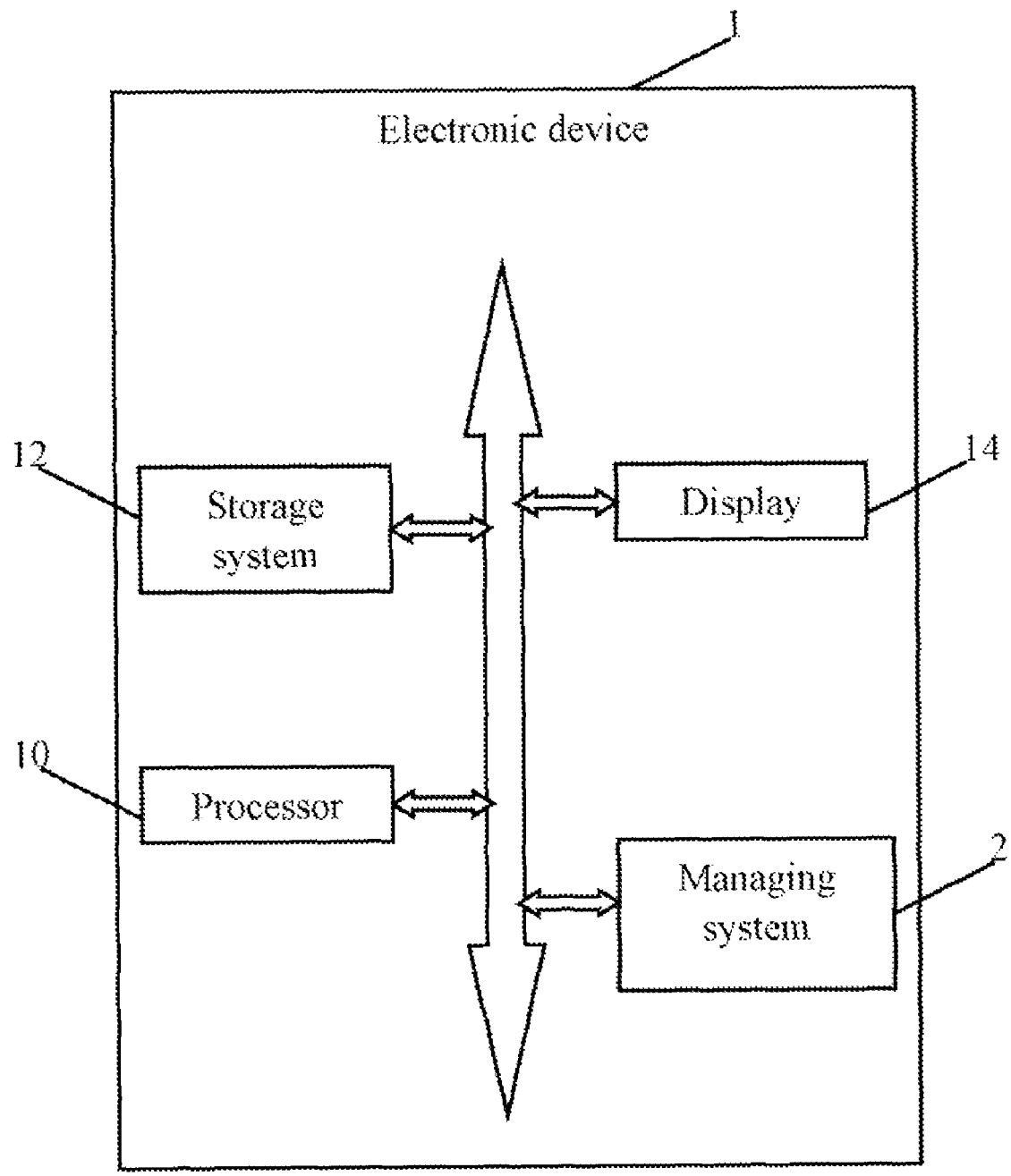
FIG. 1 is a block diagram of one embodiment of an electronic device including a managing system.

FIG. 1 is a block diagram of one embodiment of an electronic device 1 including a managing system 2. The managing system 2 may be used to manage merchandise information of a plurality of merchandises. Management of the merchandise information may include classifying the plurality of merchandises into different categories, calculating a relative coefficient between two merchandises, and linking related merchandises to a selected merchandise, for example.

The electronic device 1 may be a mobile phone, a personal digital assistant (PDA), a handheld computer, or any other kind of computing device. The electronic device 1 may further include a processor 10, a storage system 12, and a display 14. The processor 10 executes one or more computerized operations of the electronic device 1 and other applications, to provide functions of the electronic device 1. The storage system 12 stores one or more programs, such as programs of an operating system, other applications of the electronic device 1, and various kinds of data, such as the merchandise information of the plurality of merchandises, for example. In one embodiment, the electronic device 1 may be a mobile phone, and the storage system 12 may be a memory of the electronic device 1 or an external storage card, such as a memory stick, a subscriber identification module (SIM) card, a smart media card, a compact flash card, or any other type of memory card. The display 14 may display or output visible data, such as messages, images, the merchandise information, for example.

Figure 2:
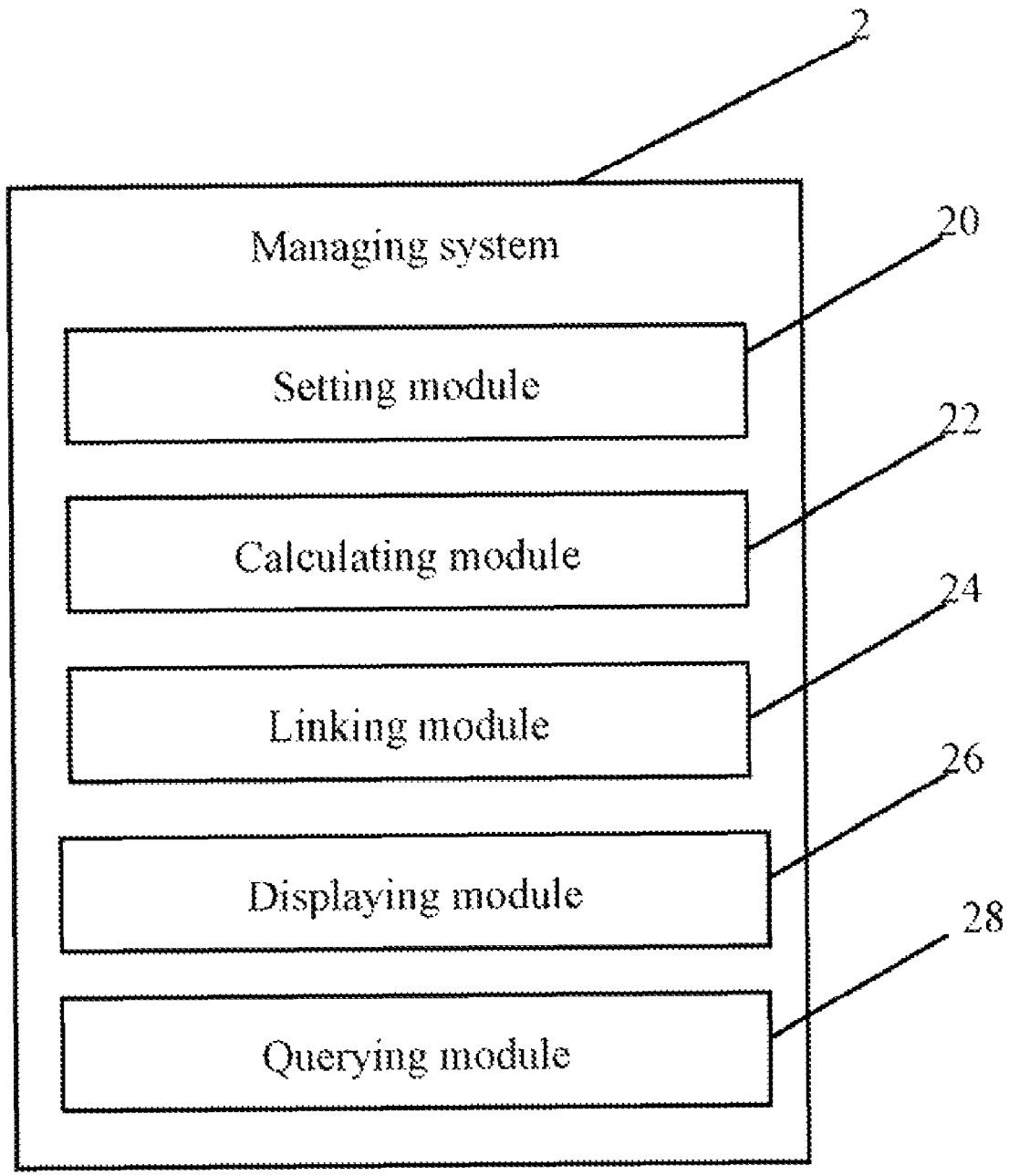
FIG. 2 is a block diagram of one embodiment of the managing system.

FIG. 2 is a block diagram of one embodiment of the managing system 2. In one embodiment, the managing system 2 includes a setting module 20, a calculating module 22, a linking module 24, a displaying module 26, and a querying module 28. The modules 20, 22, 24, 26, and 28 may comprise one or more computerized operations to be executed by the processor 10 to perform one or more operations of the electronic device 1.

The storage system 12 stores merchandise information of a plurality of merchandises. The merchandise information may be input manually or be collected from the Internet. The merchandise information includes a name, a price and an image of the merchandise, and retailer information, for example.

The setting module 20 sets a plurality of categories and multi-level sub-categories for the plurality of merchandises. In one embodiment, each of the categories may include one or more sub-categories, and each of the one or more sub-categories may further include one or more sub-categories. Each of the plurality of merchandises may be assigned a category and/or a subcategory.

Figure 3:
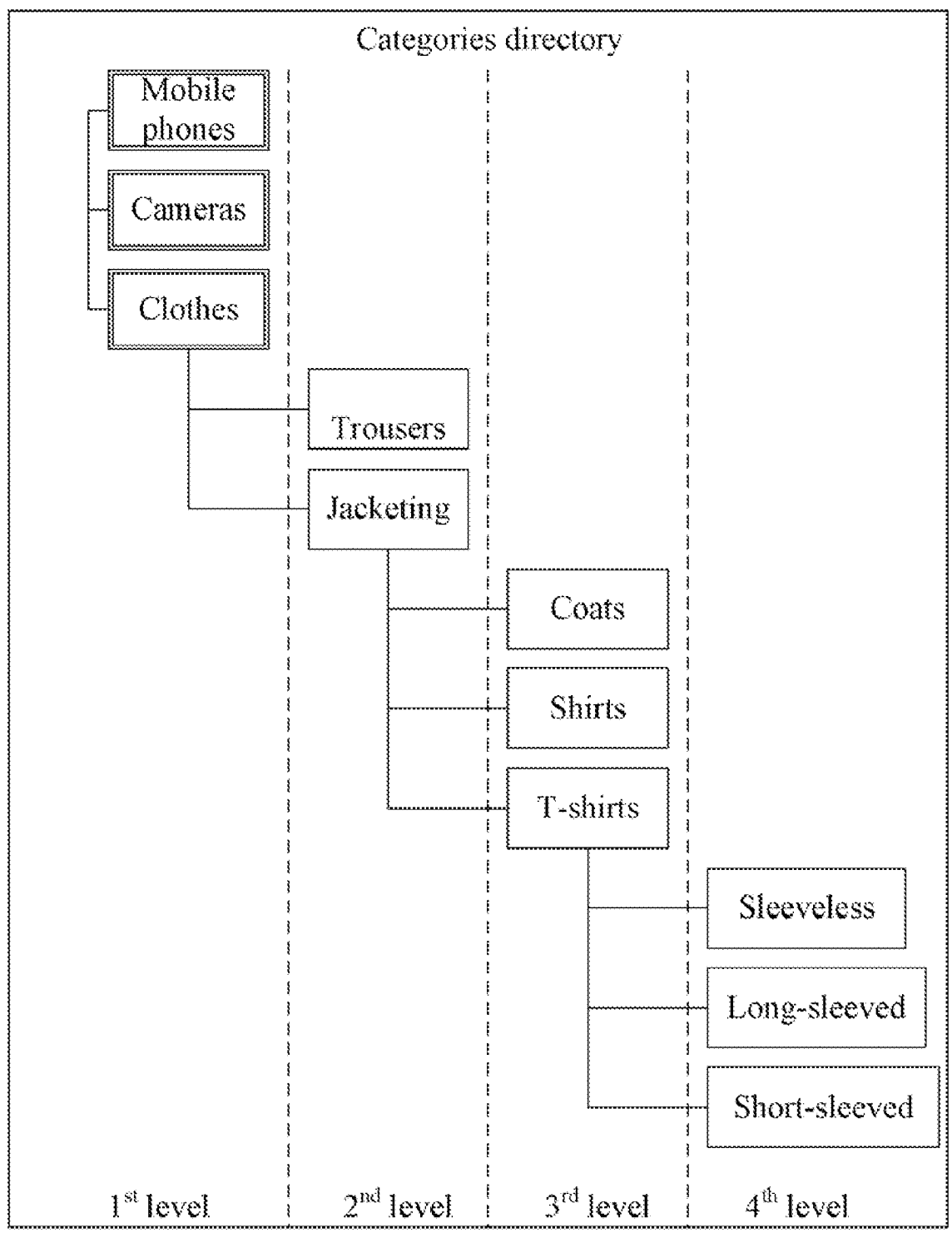
FIG. 3 is a schematic diagram of one embodiment of a category directory.

In one embodiment, each of the categories and the sub-categories is assigned a level. FIG. 3 shows a category directory tree. In the category directory tree, three categories, such as mobile phones, cameras, clothes, are listed, for example. The clothes category has two sub-categories: trousers and jacketing. The jacketing sub-category also has three sub-categories: coats, shirts, and T-shirts. The T-shirts sub-category further has three sub-categories: sleeveless, long-sleeved, and short-sleeved. The clothes category is in the first level, the trousers sub-category, and the jacketing sub-category are in the second level, the coats sub-category, the shirts sub-category, and the T-shirts sub-category are in the third level. Each level is assigned to a serial number, such as 1, 2, 3, for example.

The setting module 20 further classifies the plurality of merchandises into corresponding categories and sub-categories according to user selections. For example, a coat A is classified into the clothes category and the coats sub-category.

The calculating module 22 selects one merchandise, and calculates a relative coefficient between the selected merchandise and each of the other merchandises in the same category as the selected merchandise. In one exemplary embodiment, the relative coefficient is calculated according to a formula of $F(x)=(N/M)*R1+(1-O/P)*R2$ based on a category coefficient and a price coefficient. Details of $F(x)$ will be provided below.

In the above formula, "$F(x)$" represents the relative coefficient of two merchandises in the same category. If the two merchandises belong to the same sub-category, "N" represents a serial number of a level of the same sub-category. If the two merchandises do not belong to the same sub-category, thus "N" represents a serial number of a level of the same category. For example, the coats sub-category and the shirts sub-category both belong to the jacketing sub-category, which is in the second level having a serial number 2, thus, "N" is 2. For another example, the trousers sub-category and the jacketing sub-category both belong to the clothes category, but do not belong to any same sub-category. The clothes category is in the first level, thus, "N" is 1.

Each category may have multi-level sub-categories. "M" represents a total number of levels of each category. For example, as shown in FIG. 3, the clothes category has four levels, thus, "M" is 4. "O" represents a price difference between the two merchandises. "P" represents a sum of prices of the two merchandises.

In the formula, "(N/M)" represents the category coefficient, and "(1−O/P)" represents the price coefficient. "R1" represents a proportion between the category coefficient and the relative coefficient. "R2" represents a proportion between the price coefficient and the relative coefficient. "R1" and "R2" may be predefined according to user requirements. For example, "R1" is predefined as $7/10$, and "R2" is predefined as $3/10$.

For example, a relative coefficient "F(x)" of a sleeveless T-shirt and a long-sleeved T-shirt needs to be calculated. The sleeveless T-shirt and the long-sleeved T-shirt both belong to the T-shirts sub-category, which is in the third level. Thus, "N" is 3. The sleeveless T-shirt and the long-sleeved T-shirt are both in the clothes category, which has four levels. Thus, "M" is 4. For example, a price of the sleeveless T-shirt is 100 dollars, and a price of the long-sleeved T-shirt is 200 dollars. Thus, a price coefficient "O" of the sleeveless T-shirt and the long-sleeved T-shirt is 100. A sum of prices "P" of the sleeveless T-shirt and the long-sleeved T-shirt is 300. Accordingly, $F(x)=(3/4)*(7/10)+(1-100/300)*(3-10)=0.725$.

In another embodiment, the relative coefficient of two merchandises in the different categories may be calculated according to a price coefficient merely.

Figure 5:
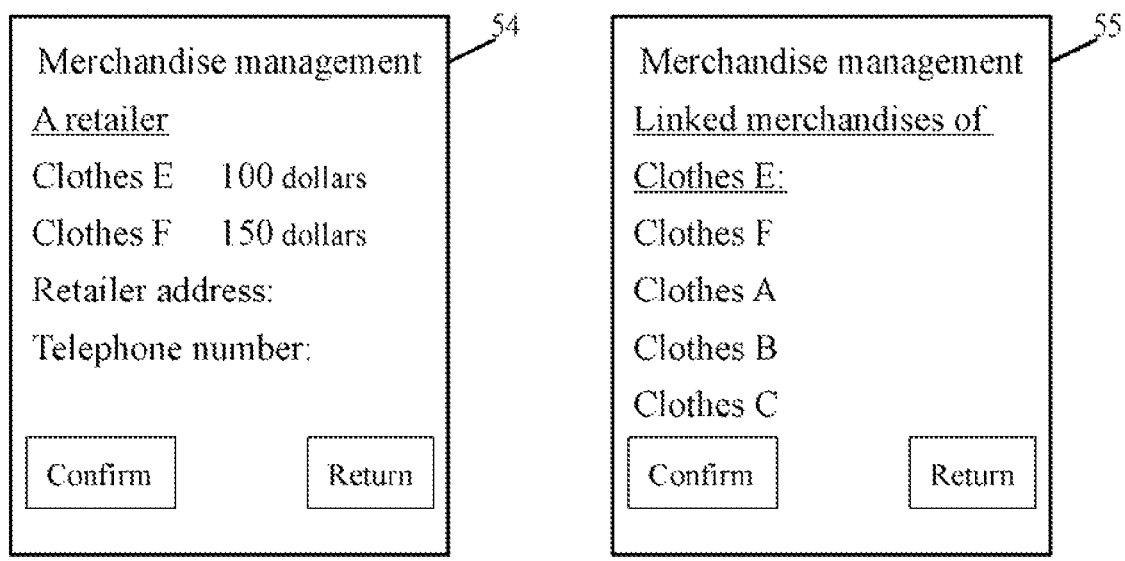

The linking module 24 predefines a threshold value to compare with calculated relative coefficients, and determines one or more relative coefficients that are larger than the threshold value. The linking module 24 also selects related merchandises corresponding to the determined relative coefficients, and links the related merchandises to the selected merchandise. For example, in an interface 55 in FIG. 5, clothes E has four linked merchandises: clothes F, clothes A, clothes B, and clothes C. In one embodiment, if the "clothes F" item is selected, information of the "clothes F" would be shown in an interface. Through the linked merchandises, the user may find related merchandise easily. The linking module 24 further sorts the linked merchandises sequentially according to the relative coefficients.

For example, the calculating module 22 calculates one or more relative coefficients between merchandise A and all merchandises in the same category as merchandise A. The linking module 24 determines one or more relative coefficients that are larger than the threshold value (e.g., 0.5), and selects one or more merchandises corresponding to the determined relative coefficients. Then the linking module 24 links the selected merchandises to merchandise A.

The displaying module 26 displays the merchandise information and the linked merchandises of the selected merchandise on the display 14 of the electronic device 1.

The querying module 28 queries corresponding merchandise information according to one or more search keywords input by the user. The displaying module 26 further display queried merchandise information on the display 14.

Figure 4:
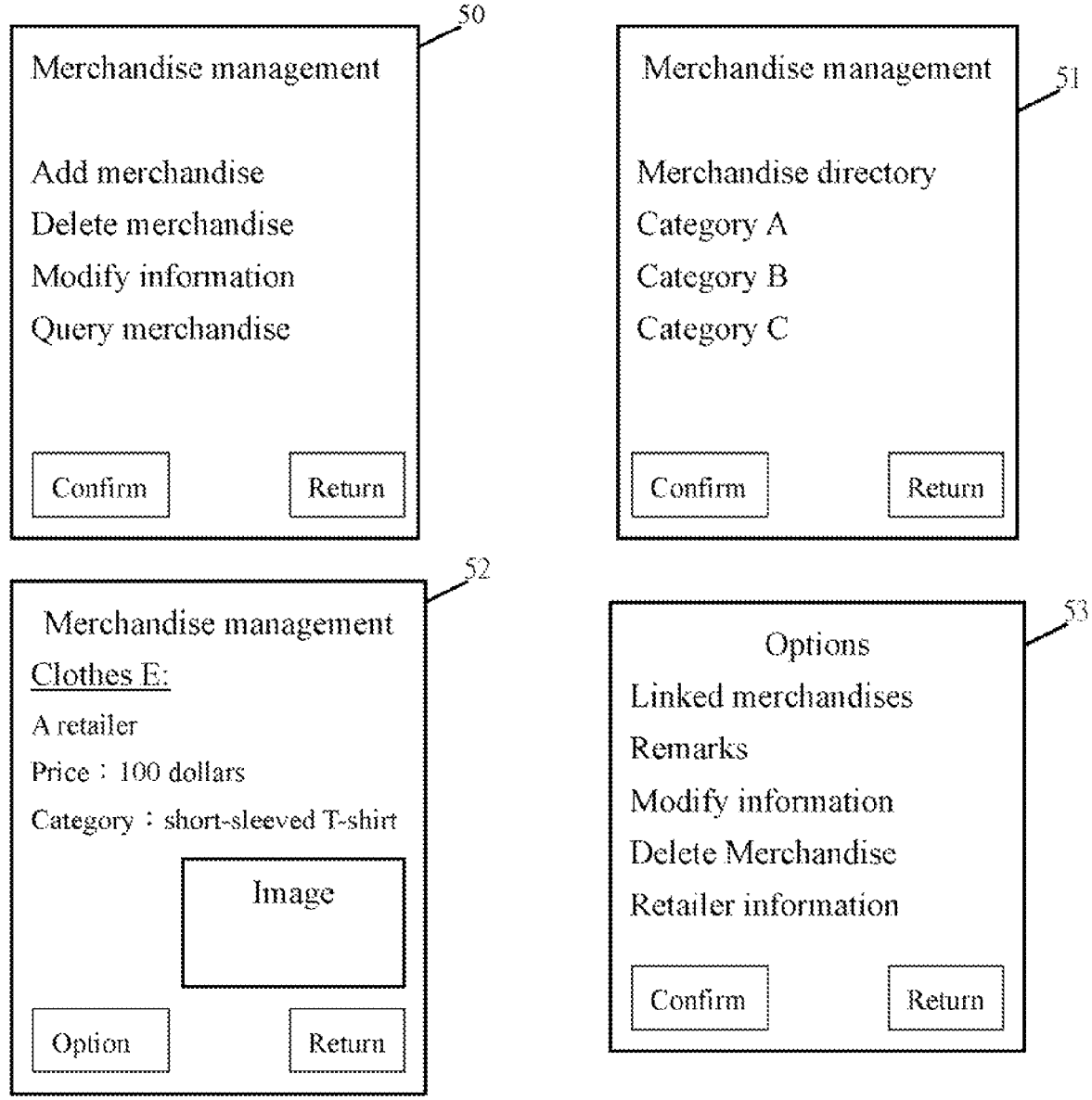
FIG. 4 and FIG. 5 are schematic diagrams of one embodiment of user interfaces provided by the managing system of the FIG. 2.

The managing system 2 also provides a plurality of user interfaces to manage, view, or query the merchandise information. Referring to FIG. 4, an interface 50 shows function options to manage the merchandise information, such as, add/delete/query merchandise, and modify merchandise information, for example. An interface 51 shows a category directory to be viewed, selected, or modified by the user. An interface 52 shows detailed merchandise information of clothes E, for example. If an "option" button in the interface 52 is clicked, a plurality of function options (e.g., the linked merchandises, remarks, shop information, for example) linked to the clothes E are shown in an interface 53. If an option of the shop information in the interface 53 is selected, merchandises in the shop and relevant shop information, such as a shop address, a telephone number, are shown in an interface 54 in FIG. 5.

Figure 6:
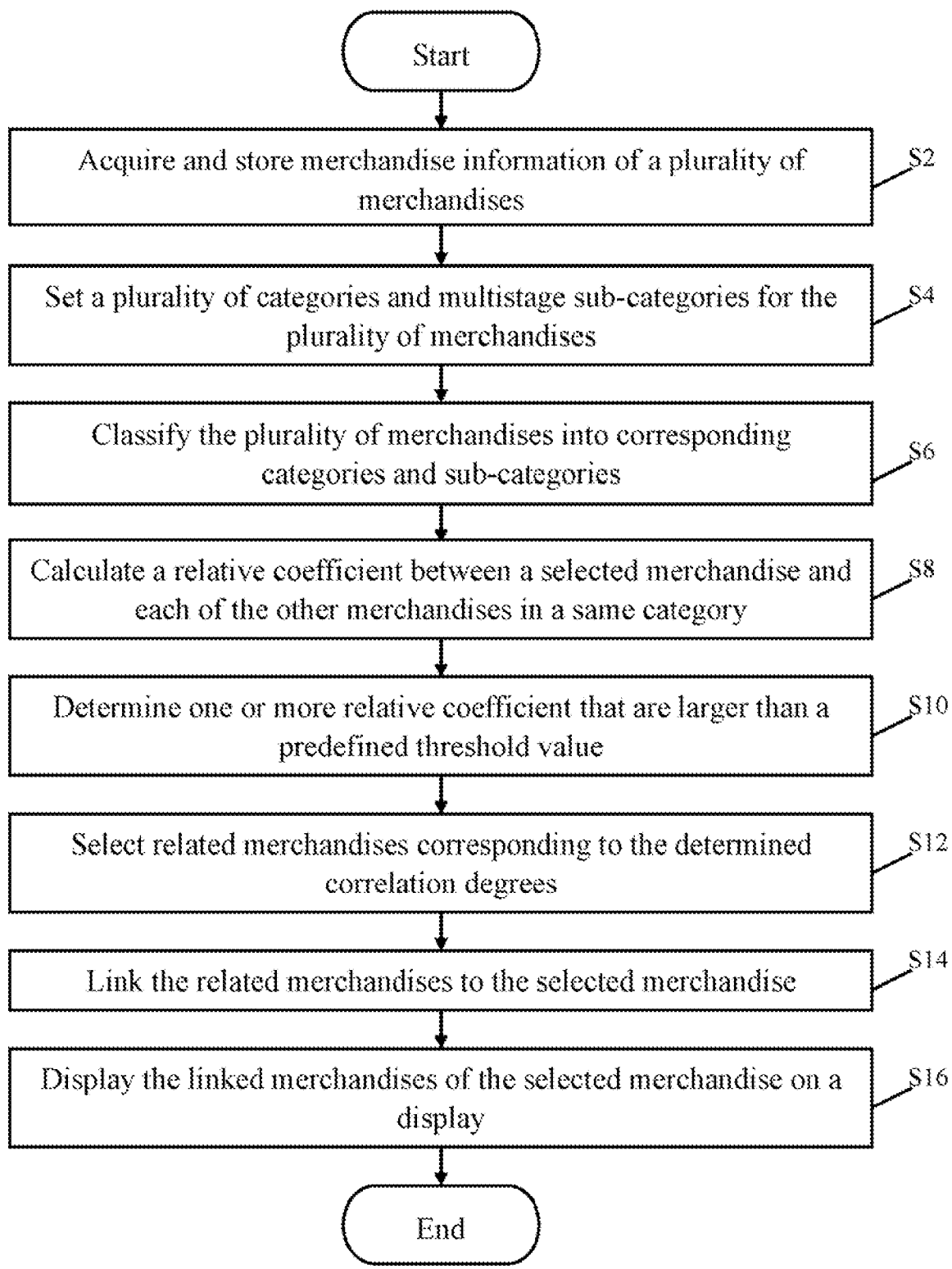
FIG. 6 is a flowchart of one embodiment of a method for managing merchandise information.

FIG. 6 is a flowchart of one embodiment of a method for managing merchandise information stored in the electronic device 1. Depending on the embodiment, additional blocks may be added, others removed, and the ordering of the blocks may be replaced.

In block S2, the electronic device 1 acquires merchandise information of a plurality of merchandises from user input or the Internet, and stores the merchandise information into the storage system 12.

In block S4, the setting module 20 sets a plurality of categories and multi-level sub-categories for the plurality of merchandises. As mentioned above, each of the categories and the sub-categories is assigned a level, and each level is assigned to a serial number, such as 1, 2, 3, for example.

In block S6, the setting module 20 further classifies the plurality of merchandises into corresponding categories and sub-categories according to user selections.

In block S8, the calculating module 22 selects one merchandise, and calculates a relative coefficient between the selected merchandise and each of the other merchandises in the same category as the selected merchandise. The relative coefficient may be calculated according to a formula of $F(x)=(N/M)*R1+(1-O/P)*R2$ based on a category coefficient and a price coefficient.

In block S10, the linking module 24 determines one or more relative coefficients that are larger than a predefined threshold value. In block S12, the linking module 24 selects related merchandises corresponding to the determined relative coefficients.

In block S14, the linking module 24 links the related merchandises to the selected merchandise, and sorts the linked merchandises sequentially according to the relative coefficients.

In block S16, the displaying module 26 displays the merchandise information and the linked merchandises of the selected merchandise on the display 14 of the electronic device 1.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for managing merchandise information, the method comprising:
   acquiring merchandise information of a plurality of merchandises, and storing the merchandise information into a storage system of an electronic device;
   setting a plurality of categories and multi-level sub-categories, and classifying the plurality of merchandises into corresponding categories and sub-categories, wherein each of the categories and sub-categories is assigned a level, and each level is assigned to a serial number;

calculating a relative coefficient between a selected merchandise and each of the other merchandises in the same category as the selected merchandise according to a price coefficient, a category coefficient and a formula of $F(x)=(N/M)*R1+(1-O/P)*R2$, wherein:
- $F(x)$ represents the relative coefficient of two merchandises in the same category;
- N represents a serial number of a level of the same sub-category if the two merchandises both belong to the same sub-category, or represents a serial number of a level of the category if the two merchandises do not belong to the same sub-category;
- M represents a total number of levels that the category has
- R1 represents a proportion between the category coefficient and the relative coefficient;
- O represents a price difference between the two merchandises;
- P represents a sum of prices of the two merchandises; and
- R2 represents a proportion between the price coefficient and the relative coefficient;

predefining a threshold value to compare with calculated relative coefficients;

determining one or more relative coefficients that are larger than the threshold value, and selecting related merchandises corresponding to the determined relative coefficients;

linking the related merchandises to the selected merchandise; and displaying the merchandise information and the linked merchandises of the selected merchandise on a display of the electronic device.

2. The method according to claim 1, further comprising:
sorting the linked merchandises sequentially according to the relative coefficients.

3. The method according to claim 1, further comprising:
querying merchandise information according to one or more input search keywords; and displaying queried merchandise information on the display.

4. The method according to claim 1, before the calculating step further comprising:
predefining the proportion between the category coefficient and the relative coefficient, and predefining the proportion between the price coefficient and the relative coefficient.

5. A computing system for managing merchandise information stored in an electronic device, the electronic device comprising:
- a storage system to store merchandise information of a plurality of merchandises;
- at least one processor; and
- one or more programs stored in the storage system and being executable by the at least one processor, the one or more programs comprising:
  - a setting module operable to set a plurality of categories and multi-level sub-categories, and classify the plurality of merchandises into corresponding categories and sub-categories, wherein each of the categories and sub-categories is assigned a level, and each level is assigned to a serial number;
  - a calculating module operable to calculate a relative coefficient between a selected merchandise and each of the other merchandises in the same category as the selected merchandise according to a price coefficient a category coefficient and a formula of $F(x)=(N/M)*R1+(1-O/P)*R2$, wherein:
    - $F(x)$ represents the relative coefficient of two merchandises in the same category;
    - N represents a serial number of a level of the same sub-category if the two merchandises both belong to the same sub-category, or represents a serial number of a level of the category if the two merchandises do not belong to the same sub-category;
    - M represents a total number of levels that the category has;
    - R1 represents a proportion between the category coefficient and the relative coefficient;
    - O represents a price difference between the two merchandises;
    - P represents a sum of prices of the two merchandises; and
    - R2 represents a proportion between the price coefficient and the relative coefficient;
  - a linking module operable to predefine a threshold value to compare with calculated relative coefficients, determine one or more relative coefficients that are larger than the threshold value, select related merchandises corresponding to the determined relative coefficients, and link the related merchandises to the selected merchandise; and
  - a displaying module operable to display the merchandise information and the linked merchandises of the selected merchandise on a display of the electronic device.

6. The computing system according to claim 5, wherein the linking module is further operable to sort the linked merchandises sequentially according to the relative coefficients.

7. The computing system according to claim 5, wherein the one or more programs further comprises a querying module operable to query merchandise information according to one or more input search keywords, and display queried merchandise information on the display.

8. The computing system according to claim 5, wherein the setting module is further operable to predefine the proportion between the category coefficient and the relative coefficient, and predefine the proportion between the price coefficient and the relative coefficient.

9. A storage medium storing a set of instructions, the set of instructions capable of being executed by a processor to perform a method for managing merchandise information, the method comprising:
- acquiring merchandise information of a plurality of merchandises, and storing the merchandise information into a storage system of an electronic device;
- setting a plurality of categories and multi-level sub-categories, and classifying the plurality of merchandises into corresponding categories and sub-categories, wherein each of the categories and sub-categories is assigned a level, and each level is assigned to a serial number;
- calculating a relative coefficient between a selected merchandise and each of the other merchandises in the same category as the selected merchandise according to a price coefficient, a category coefficient and a formula of $F(x)=(N/M)*R1+(1-O/P)*R2$, wherein:
  - $F(x)$ represents the relative coefficient of two merchandises in the same category;
  - N represents a serial number of a level of the same sub-category if the two merchandises both belong to the same sub-category, or represents a serial number of a level of the category if the two merchandises do not belong to the same sub-category;

M represents a total number of levels that the category has

R1 represents a proportion between the category coefficient and the relative coefficient;

O represents a price difference between the two merchandises;

P represents a sum of prices of the two merchandises; and

R2 represents a proportion between the price coefficient and the relative coefficient;

predefining a threshold value to compare with calculated relative coefficients;

determining one or more relative coefficients that are larger than the threshold value, and selecting related merchandises corresponding to the determined relative coefficients;

linking the related merchandises to the selected merchandise;

displaying the merchandise information and the linked merchandises of the selected merchandise on a display of the electronic device.

10. The storage medium as claimed in claim 9, wherein the method further comprises:

sorting the linked merchandises sequentially according to the relative coefficients.

11. The storage medium as claimed in claim 9, wherein the method further comprises:

querying merchandise information according to one or more input search keywords; and displaying queried merchandise information on the display.

12. The storage medium as claimed in claim 9, wherein the method further comprises:

predefining the proportion between the category coefficient and the relative coefficient, and predefining the proportion between the price coefficient and the relative coefficient, before the calculating step.

* * * * *